(12) United States Patent
Sakaguchi et al.

(10) Patent No.: US 10,301,492 B2
(45) Date of Patent: *May 28, 2019

(54) METHOD OF USING RECORDED MATTER, RECORDED MATTER, AND METHOD OF MANUFACTURING RECORDED MATTER

(71) Applicant: Ricoh Company, Ltd., Tokyo (JP)

(72) Inventors: Hiromi Sakaguchi, Kanagawa (JP); Takashi Tamai, Kanagawa (JP); Shun Saito, Kanagawa (JP); Sayuri Kojima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/710,953

(22) Filed: Sep. 21, 2017

(65) Prior Publication Data

US 2018/0094152 A1 Apr. 5, 2018

(30) Foreign Application Priority Data

Oct. 3, 2016 (JP) .................................. 2016-195827
Aug. 25, 2017 (JP) .................................. 2017-161994

(51) Int. Cl.
| | | |
|---|---|---|
| *C09D 11/322* | (2014.01) | |
| *C09D 11/30* | (2014.01) | |
| *B41J 2/175* | (2006.01) | |
| *C09D 11/38* | (2014.01) | |
| *B41J 29/13* | (2006.01) | |
| *C09D 11/102* | (2014.01) | |
| *C09D 11/107* | (2014.01) | |
| *C09D 11/033* | (2014.01) | |

(52) U.S. Cl.
CPC ............ *C09D 11/322* (2013.01); *B41J 2/175* (2013.01); *B41J 2/17509* (2013.01); *B41J 2/17513* (2013.01); *B41J 2/17523* (2013.01); *B41J 2/17553* (2013.01); *B41J 29/13* (2013.01); *C09D 11/102* (2013.01); *C09D 11/107* (2013.01); *C09D 11/30* (2013.01); *C09D 11/38* (2013.01); *B41J 2/1752* (2013.01); *C09D 11/033* (2013.01)

(58) Field of Classification Search
CPC ... C09D 11/033; C09D 11/102; C09D 11/107; C09D 11/30; C09D 11/322; C09D 11/38
USPC .................................................... 428/195.1
See application file for complete search history.

(56) References Cited

U.S. PATENT DOCUMENTS

| | | |
|---|---|---|
| 2014/0002539 A1 | 1/2014 | Goto et al. |
| 2016/0376455 A1 | 12/2016 | Katoh et al. |
| 2017/0009092 A1 | 1/2017 | Gotou et al. |
| 2017/0022381 A1 | 1/2017 | Takamura et al. |

(Continued)

FOREIGN PATENT DOCUMENTS

JP 2012-207202 10/2012

*Primary Examiner* — Bruce H Hess
(74) *Attorney, Agent, or Firm* — Oblon, McClelland, Maier & Neustadt, L.L.P.

(57) ABSTRACT

A method of using recorded matter is provided. The method includes conveying a recorded matter at a relative humidity of 40% or less, where the recorded matter includes a recording medium and a recorded layer on the recording medium. The recorded layer includes an organic solvent, a colorant, and a resin. The organic solvent includes a hexanediol and a propylene glycol. The resin includes an acrylic resin and a urethane resin, where a mass ratio of the urethane resin to the acrylic resin ranges from 0.1 to 0.7.

8 Claims, 3 Drawing Sheets

(56) References Cited

U.S. PATENT DOCUMENTS

2017/0121543 A1 5/2017 Sakaguchi et al.
2017/0130081 A1 5/2017 Toyama et al.

METHOD OF USING RECORDED MATTER, RECORDED MATTER, AND METHOD OF MANUFACTURING RECORDED MATTER

CROSS-REFERENCE TO RELATED APPLICATIONS

This patent application is based on and claims priority pursuant to 35 U.S.C. § 119(a) to Japanese Patent Application Nos. 2016-195827 and 2017-161994, filed on Oct. 3, 2016 and Aug. 25, 2017, respectively, in the Japan Patent Office, the entire disclosure of each of which is hereby incorporated by reference herein.

BACKGROUND

Technical Field

The present disclosure relates to a method of using recorded matter, a recorded matter, and a method of manufacturing recorded matter.

Description of the Related Art

Inkjet recording methods have advantages such that the process is simple and full colorization is easy in comparison with other recording methods. Therefore, high definition images can be obtained by a device having a simple configuration. For this reason, inkjet recording methods are widely diffusing from home use to office use, commercial printing, and industrial printing.

In the field of commercial printing, recorded matter is generally subjected to an aftertreatment using a bookbinding machine, a folding machine, etc. Thus, recorded matter is required to be applicable to various aftertreatment environments. Recorded matter is also required to have excellent resistance to abrasion and blocking in various use environments.

SUMMARY

In accordance with some embodiments of the present invention, a method of using recorded matter is provided. The method includes conveying a recorded matter at a relative humidity of 40% or less, where the recorded matter includes a recording medium and a recorded layer on the recording medium. The recorded layer includes an organic solvent, a colorant, and a resin. The organic solvent includes a hexanediol and a propylene glycol. The resin includes an acrylic resin and a urethane resin, where a mass ratio of the urethane resin to the acrylic resin ranges from 0.1 to 0.7.

In accordance with some embodiments of the present invention, a recorded matter is provided. The recorded matter includes a recording medium and a recorded layer on the recording medium. The recorded layer includes an organic solvent, a colorant, and a resin. The organic solvent includes a hexanediol and a propylene glycol. The resin includes an acrylic resin and a urethane resin, where a mass ratio of the urethane resin to the acrylic resin ranges from 0.1 to 0.7.

In accordance with some embodiments of the present invention, a method of manufacturing recorded matter is provided. The method includes forming a recorded layer on a recording medium and conveying the recorded medium at a relative humidity of 40% or less, where the recorded layer includes an organic solvent, a colorant, and a resin. The organic solvent includes a hexanediol and a propylene glycol. The resin includes an acrylic resin and a urethane resin, where a mass ratio of the urethane resin to the acrylic resin ranges from 0.1 to 0.7.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
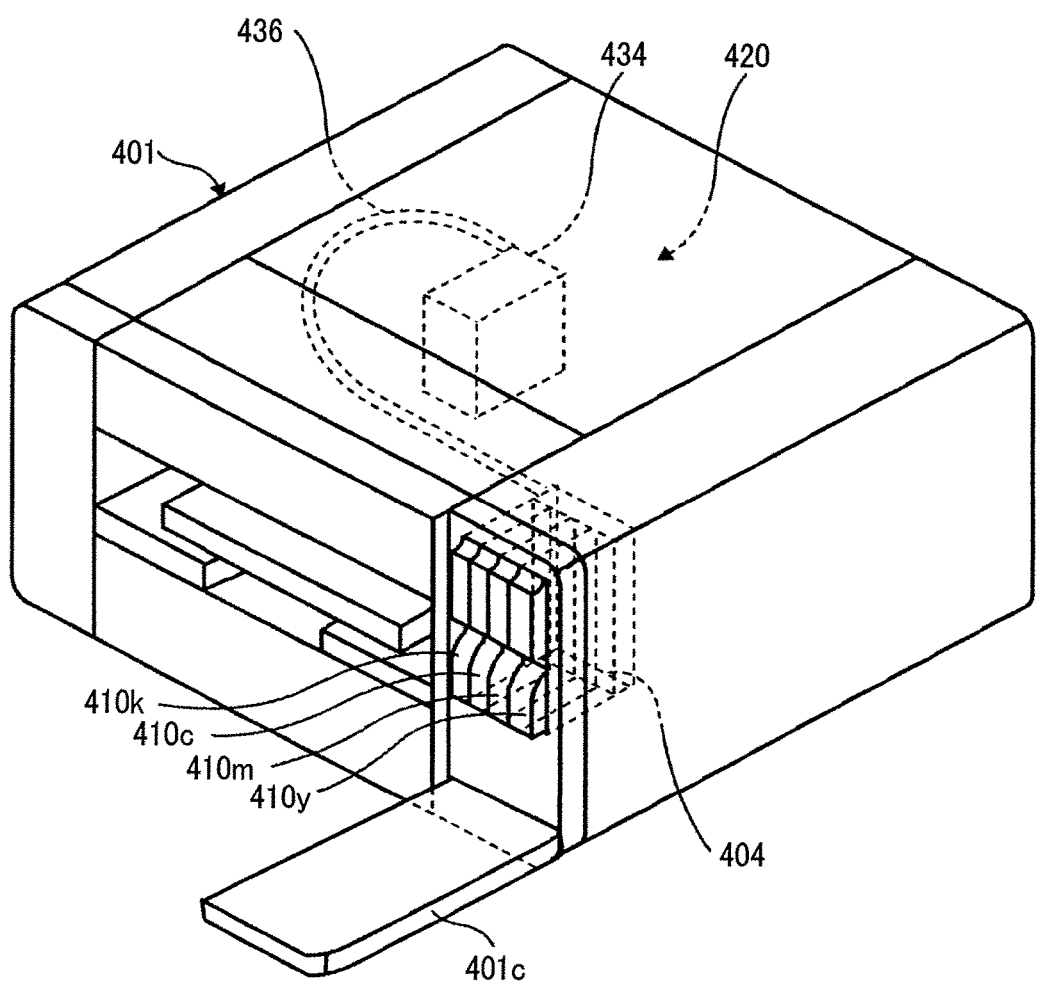
FIG. 1 is a perspective view of a serial-type image forming apparatus according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, a recorded matter is provided that suppresses the generation of static electricity and occurrence of conveyance troubles even in low-humidity environments and provides excellent abrasion resistance in low-humidity environments.

Method of Using Recorded Matter

In accordance with some embodiments of the present invention, a method of using recorded matter is provided that includes the process of conveying a recorded matter at a relative humidity of 40% or less, where the recorded matter includes a recording medium and a recorded layer containing an organic solvent, a colorant, and a resin. The organic solvent includes a hexanediol and propylene glycol.

The resin includes an acrylic resin and a urethane resin, where a mass ratio of the urethane resin to the acrylic resin ranges from 0.1 to 0.7.

Recorded Matter

In accordance with some embodiments of the present invention, a recorded matter is provided that includes a recording medium and a recorded layer containing an organic solvent, a colorant, and a resin. The organic solvent includes a hexanediol and propylene glycol. The resin includes an acrylic resin and a urethane resin, where a mass ratio of the urethane resin to the acrylic resin ranges from 0.1 to 0.7.

Generally, when recorded matter is used in low-humidity environments having a relative humidity of 40% or less, troubles in conveying the recorded matter (hereinafter "recorded matter conveyance troubles") are likely to occur due to generation of static electricity. When propylene glycol and a hexanediol are contained in the image (i.e., recorded layer), it is expected that moisture is retained in the image or recording medium while generation of static electricity is suppressed. Specifically, the propylene glycol and hexanediol are expected to exert such effects in the image and recording medium, respectively. In the present disclosure, the recorded matter conveyance troubles include those occurring in any of the processes of ejecting, winding up, folding, cutting, and conveying the recorded matter.

An image containing an acrylic resin and a urethane resin is expected to improve abrasion resistance in various environments.

An image containing a urethane resin tends to exhibit higher abrasion resistance than that containing an acrylic resin because urethane resins are lower in hardness and higher in elasticity than acrylic resins.

On the other hand, an image containing a urethane resin more tends to cause a problem of image transfer than that containing an acrylic resin because of being more likely to absorb moisture in high-temperature and high-humidity environments and to increase tack force of the image. By contrast, in low-humidity environments, the image containing a urethane resin exhibits a moisture retention effect and maintains elasticity of the image, thereby suppressing deterioration of abrasion resistance. Such a moisture retention effect exhibited by the urethane resin in low-humidity environments is expected to suppress the recorded matter conveyance troubles caused due to generation of static electricity.

In view of the above facts, the inventors of the present invention have found that a recorded matter including an image containing both an acrylic resin and a urethane resin at a specific mass ratio and further containing propylene glycol and a hexanediol suppresses the recorded matter conveyance troubles caused due to generation of static electricity in low-humidity environments, while exhibiting high image fixation strength in both low-humidity environments and high-temperature and high-humidity environments.

In accordance with some embodiments of the present invention, a method of using recorded matter is provided that includes the process of conveying a recorded matter at a relative humidity of 40% or less, where the recorded matter includes a recording medium and a recorded layer containing an organic solvent and a colorant. The organic solvent includes a hexanediol and propylene glycol. An infrared absorption spectrum of the recorded layer, obtained by Fourier transform infrared spectroscopy, exhibits an area ratio (B/A) of an area B to an area A ranging from 0.3 to 1.0, where the area A is defined between the spectrum within a wavenumber range of from 692 to 707 $cm^{-1}$ and a first tangent line connecting a first minimum point of the spectrum within a first wavenumber range of from 710 to 740 $cm^{-1}$ and a second minimum point of the spectrum within a second wavenumber range of from 660 to 690 $cm^{-1}$, and the area B is defined between the spectrum within a wavenumber range of from 1,731 to 1,750 $cm^{-1}$ and a second tangent line connecting a third minimum point of the spectrum within a third wavenumber range of from 1,660 to 1,690 $cm^{-1}$ and a fourth minimum point of the spectrum within a fourth wavenumber range of from 1,760 to 1,790 $cm^{-1}$.

In the above methods of using recorded matter, the recorded matter is conveyed at a relative humidity of 40% or less. Preferably, the recorded matter is conveyed at a relative humidity of 30% or less. More preferably, the recorded matter is further conveyed at a temperature of 30° C. or more and a relative humidity of 80% or more.

Recorded Layer

The recorded layer contains an organic solvent, a colorant, and a resin, and optionally a wax and other components as necessary.

The recorded layer may be formed with an ink containing an organic solvent, a colorant, and a resin, and optionally a wax and other components as necessary.

Resin

The resin includes an acrylic resin and a urethane resin, and optionally other resins as necessary.

Preferably, the resin is dispersed in water forming a water dispersion.

Specific examples of the acrylic resin include, but are not limited to, acrylic silicone resins and styrene acrylic resins. Each of these resins can be used alone or in combination with others. For abrasion resistance, acrylic silicone resins are preferable.

Specific examples of the urethane resin include, but are not limited to, polycarbonate urethane resins, polyester urethane resins, and polyether urethane resins. Each of these resins can be used alone or in combination with others. For abrasion resistance of the image (recorded layer) and storage stability of the ink, polycarbonate urethane resins are preferable. In the present disclosure, the polycarbonate urethane resins refer to resins having a polycarbonate structure. Examples thereof include polycarbonate-based urethane resins.

The resin is available either commercially or synthetically. Specific examples of commercially-available products of the acrylic resin include, but are not limited to, SYMAC® (available from Toagosei Co., Ltd.), VONCOAT (available from DIC Corporation), and AQUABRID (available from Daicel FineChem Ltd.). Specific examples of commercially-available products of the urethane resin include, but are not limited to, UCOAT (available from Sanyo Chemical Industries, Ltd.) and TAKELAC (available from Mitsui Chemicals, Inc.). Specific examples of commercially-available products of the polycarbonate urethane resin include, but are not limited to, TAKELAC W-4000, TAKELAC W-6010, and TAKELAC W-6110 (available from Mitsui Chemicals, Inc.). Each of these resins can be used alone or in combination with others.

Preferably, the resin has a Martens hardness of 10 $N/mm^2$ or less, for abrasion resistance.

Preferably, the urethane resin has a Martens hardness of 10 $N/mm^2$ or less, more preferably from 0.1 to 10 $N/mm^2$, for abrasion resistance.

The Martens hardness is measured as follows. First, a resin particle liquid is applied onto a substrate, such as a glass slide (e.g., White Crown Glass Slide S1111 available from Matsunami Glass Ind., Ltd.), to form a film having an average thickness of 10 μm or more. The film is pre-dried at 60° C. for 3 hours and dried at 100° C. for 6 hours to obtain a resin film. The resin film is subjected to a measurement by a microhardness measurement instrument (FISCHER-SCOPE HM2000 available from Fischer Instruments K.K.) in which a Vickers indenter is pressed into the resin film with a force of 1.0 mN over a period of 10 seconds, kept for 5 seconds, and drawn up with a force of 1.0 mN over a period of 10 seconds.

Preferably, the resin is dispersed in the ink in the form of particles (hereinafter "resin particles").

The volume average particle diameter of the resin particles is not particularly limited and can be suitably selected to suit to a particular application. Preferably, the volume average particle diameter is in the range of from 10 to 1,000 nm, more preferably from 10 to 200 nm, and most preferably from 10 to 100 nm, to obtain good fixability and high image hardness. The volume average particle diameter of the resin particles can be measured with a particle size distribution analyzer (NANOTRAC WAVE-UT151 available from MicrotracBEL Corp.).

Preferably, solid contents dispersed in the ink have a maximum frequency particle diameter in the range of from 20 to 1,000 nm, more preferably from 20 to 150 nm, based on the number of solid contents, for improving discharge stability and image quality (e.g., image density) of the ink. The solid contents include the resin particles and pigment particles. The particle diameter of the solid contents can be measured with a particle size distribution analyzer (NANOTRAC WAVE-UT151 available from MicrotracBEL Corp.).

The content rate of the resin in the recorded layer can be measured by nuclear magnetic resonance (NMR), differential scanning calorimetry (DSC), or differential thermal analysis (DTA).

The content rate of the resin in the recorded layer is preferably in the range of from 30% to 80% by mass, and more preferably in the range of from 50% to 60% by mass.

The content rate of the acrylic resin in the recorded layer is preferably in the range of from 10% to 60% by mass, and more preferably in the range of from 30% to 50% by mass.

The content rate of the urethane resin in the recorded layer is preferably in the range of from 5% to 30% by mass, and more preferably in the range of from 10% to 30% by mass.

Mass Ratio (Urethane Resin/Acrylic Resin)

The mass ratio of the urethane resin to the acrylic resin is preferably in the range of from 0.1 to 0.7, and more preferably in the range of from 0.4 to 0.7, for more improving abrasion resistance of the image and discharge stability and storage stability of the ink.

Organic Solvent

The organic solvent includes propylene glycol (i.e., 1,2-propanediol) and a hexanediol, and optionally other organic solvents as necessary.

Specific examples of the hexanediol include, but are not limited to, 1,2-hexanediol, 1,6-hexanediol, 1,3-hexanediol, 2,5-hexanediol, and 1,5-hexanediol. Each of these compounds can be used alone or in combination with others. Among these compounds, 1,2-hexanediol is preferable.

Other Organic Solvents

Specific examples of the other organic solvents include, but are not limited to: polyols other than propylene glycol and hexanediols; ethers, such as polyol alkyl ethers and polyol aryl ethers; nitrogen-containing heterocyclic compounds; amides; amines; and sulfur-containing compounds. Each of these compounds can be used alone or in combination with others. Among these compounds, 1,6-hexanediol and 3-ethyl-3-hydroxymethyloxetane are preferable.

The organic solvent in the recorded layer can be quantified by gas chromatography. Specifically, a certain area of the recorded layer is extracted into a high-boiling-point solvent and subjected to gas chromatography.

The content rate of the organic solvent in the ink is preferably in the range of from 10% to 60% by mass, and more preferably in the range of from 20% to 40% by mass.

Colorant

Specific examples of the colorant include, but are not limited to, pigments and dyes.

Usable pigments include both inorganic pigments and organic pigments. One colorant can be used alone, or two or more colorants can be used in combination. Mixed crystals can also be used as colorants.

Usable pigments include black pigments, yellow pigments, magenta pigments, cyan pigments, white pigments, green pigments, orange pigments, glossy color pigments (e.g., gold pigments, silver pigments), and metallic pigments.

Specific examples of inorganic pigments include, but are not limited to, titanium oxide, iron oxide, calcium carbonate, barium sulfate, aluminum hydroxide, barium yellow, cadmium red, chrome yellow, and carbon black produced by a known method, such as a contact method, a furnace method, and a thermal method.

Specific examples of organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, quinophthalone pigments), dye chelates (e.g., basic dye chelate, acid dye chelate), nitro pigments, nitroso pigments, and aniline black. Among these pigments, those having good affinity for solvents are preferable. In addition, resin hollow particles and inorganic hollow particles can also be used.

Specific examples of pigments used for black-and-white printing include, but are not limited to: carbon blacks (i.e., C.I. Pigment Black 7) such as furnace black, lamp black, acetylene black, and channel black; metals such as copper, iron (i.e., C.I. Pigment Black 11), and titanium oxide; and organic pigments such as aniline black (i.e., C.I. Pigment Black 1).

Specific examples of pigments used for color printing include, but are not limited to: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 184, 185, 190, 193, 202, 207, 208, 209, 213, 219, 224, 254, and 264; C.I. Pigment Violet 1 (rhodamine lake), 3, 5:1, 16, 19, 23, and 38; C.I. Pigment Blue 1,2,15 (phthalocyanine blue), 15:1, 15:2, 15:3, 15:4 (phthalocyanine blue), 16, 17:1, 56, 60, and 63; and C.I. Pigment Green 1,4,7,8,10,17,18, and 36.

Usable dyes include acid dyes, direct dyes, reactive dyes, and basic dyes. Two or more of these dyes can be used in combination.

Specific examples of usable dyes include, but are not limited to, C.I. Acid Yellow 17, 23, 42, 44, 79, and 142, C.I.

Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

Preferably, the content rate of the colorant in the ink is in the range of from 0.1% to 15% by mass, more preferably from 1% to 10% by mass, for improving image density, fixing strength, and discharge stability.

The pigment can be dispersed in the ink by any of the following methods: introducing a hydrophilic functional group to the pigment to make the pigment self-dispersible; covering the surface of the pigment with a resin; and dispersing the pigment by a dispersant.

In the method of introducing a hydrophilic functional group to the pigment to make the pigment self-dispersible, for example, a functional group such as sulfone group and carboxyl group may be introduced to the pigment (e.g., carbon) to make the pigment dispersible in water.

In the method of covering the surface of the pigment with a resin, for example, the pigment may be incorporated in a microcapsule to make the pigment self-dispersible in water. In this case, the pigment may be referred to as a resin-covered pigment. In this case, not all the pigment particles included in the ink should be covered with a resin. It is possible that a part of the pigment particles are not covered with any resin or partially covered with a resin.

In the method of dispersing the pigment by a dispersant, low-molecular dispersants and high-molecular dispersants, represented by known surfactants, may be used.

More specifically, any of anionic surfactants, cationic surfactants, ampholytic surfactants, and nonionic surfactants may be used as the dispersant depending on the property of the pigment.

For example, a nonionic surfactant RT-100 (product of Takemoto Oil & Fat Co., Ltd.) and sodium naphthalenesulfonate formalin condensate are preferably used as the dispersant.

One dispersant can be used alone, and two or more dispersants can be used in combination.

Pigment Dispersion

The ink can be obtained by mixing the pigment with other materials such as water and the organic solvent. The ink can also be obtained by, first, preparing a pigment dispersion by mixing the pigment with water, a pigment dispersant, etc., and thereafter mixing the pigment dispersion with other materials such as water and the organic solvent.

The pigment dispersion can be obtained by mixing water, the pigment, the pigment dispersant, and other components, if any. The pigment is dispersed in the pigment dispersion with the adjusted particle diameter. Preferably, the pigment dispersion is prepared with a disperser.

Preferably, the pigment dispersed in the pigment dispersion has a maximum frequency particle diameter in the range of from 20 to 500 nm, more preferably from 20 to 150 nm, based on the number of pigment particles, for improving dispersion stability of the pigment and discharge stability and image quality (e.g., image density) of the ink. The particle diameter of the pigment can be measured with a particle size distribution analyzer (NANOTRAC WAVE-UT151 available from MicrotracBEL Corp.).

Preferably, the content rate of the pigment in the pigment dispersion is in the range of from 0.1% to 50% by mass, more preferably from 0.1% to 30% by mass, for improving discharge stability and image density.

Preferably, the pigment dispersion may be subjected to filtration using a filter or a centrifugal separator to remove coarse particles, and thereafter to degassing.

The content rate of the colorant in the recorded layer can be measured by a MALDI (Matrix Assisted Laser Desorption/Ionization) method.

Mass Ratio (Resin/Colorant)

The mass ratio of the resin to the colorant is preferably in the range of from 0.50 to 3.5, more preferably from 0.50 to 3.0, and most preferably from 0.6 to 3.0, for abrasion resistance.

Area Ratio (B/A)

In an infrared absorption spectrum of the recorded layer of the recorded matter, obtained by Fourier transform infrared spectroscopy (hereinafter may be referred to as "FTIR"), an area A is defined between the spectrum within a wavenumber range of from 692 to 707 $cm^{-1}$ and a first tangent line connecting a first minimum point of the spectrum within a first wavenumber range of from 710 to 740 $cm^{-1}$ and a second minimum point of the spectrum within a second wavenumber range of from 660 to 690 $cm^{-1}$, and an area B is defined between the spectrum within a wavenumber range of from 1,731 to 1,750 $cm^{-1}$ and a second tangent line connecting a third minimum point of the spectrum within a third wavenumber range of from 1,660 to 1,690 $cm^{-1}$ and a fourth minimum point of the spectrum within a fourth wavenumber range of from 1,760 to 1,790 $cm^{-1}$. The area ratio (B/A) of the area B to the area A ranges from 0.3 to 1.0, preferably from 0.6 to 1.0. When the area ratio (B/A) is in the range of from 0.3 to 1.0, abrasion resistance is exhibited in both low-humidity environments and high-temperature and high-humidity environments, and generation of static electricity is suppressed to suppress the recorded matter conveyance troubles in low-humidity environments.

Specifically, the infrared absorption spectrum of the recorded layer may be obtained with a Fourier transform infrared spectrophotometer according to an ATR (Attenuated Total Reflection) method. More specifically, the infrared absorption spectrum of the recorded layer may be obtained by measuring the surface of the recorded layer with an instrument SPECTRUM ONE (available from PerkinElmer Japan Co., Ltd.) using a diamond indenter according to the ATR method.

Figure 3:
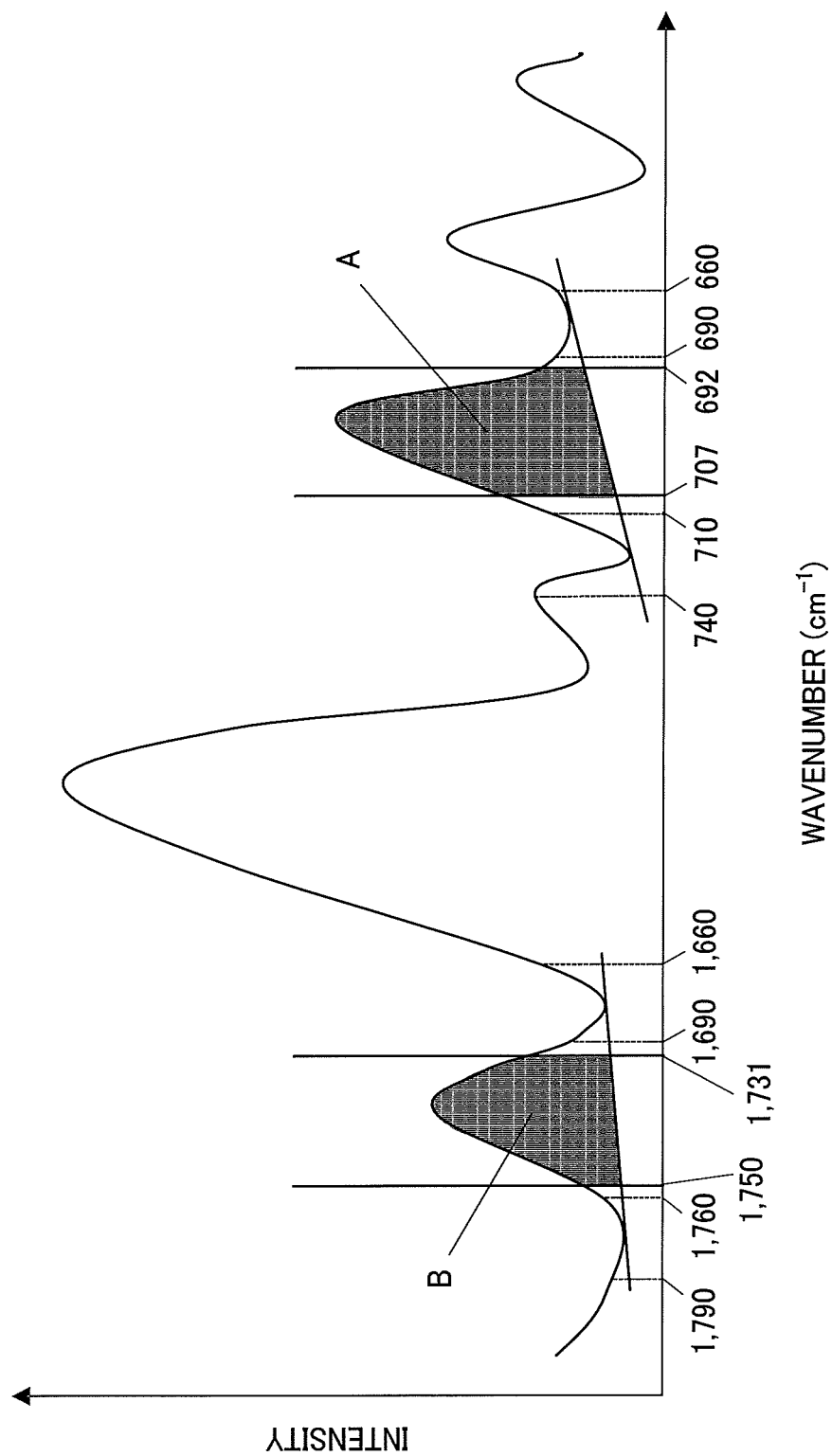
FIG. 3 is an infrared absorption spectrum of a recorded layer according to an embodiment of the present invention, indicating an area A and an area B.

FIG. 3 is an infrared absorption spectrum of the recorded layer indicating the area A and the area B.

As illustrated in FIG. 3, the area A is defined between the spectrum within a wavenumber range of from 692 to 707 $cm^{-1}$ and a first tangent line connecting a first minimum point of the spectrum within a first wavenumber range of from 710 to 740 $cm^{-1}$ and a second minimum point of the spectrum within a second wavenumber range of from 660 to 690 $cm^{-1}$, and is measurable by an instrument SPECTRUM ONE (available from PerkinElmer Japan Co., Ltd.). The area B is defined between the spectrum within a wavenumber range of from 1,731 to 1,750 $cm^{-1}$ and a second tangent line connecting a third minimum point of the spectrum within a third wavenumber range of from 1,660 to 1,690 $cm^{-1}$ and a fourth minimum point of the spectrum within a fourth wavenumber range of from 1,760 to 1,790 $cm^{-1}$, and is measurable in the same manner as the area A.

Wax

The recorded layer may further contain a wax for more improving abrasion resistance.

The wax is capable of reducing dynamic friction coefficient of the surface of the recorded layer. In particular, when the wax is used in combination with the urethane resin, abrasion resistance of the image is drastically improved. This is because the urethane resin, which is contained for the purpose of improving abrasion resistance of the image, is suppressed from increasing dynamic friction coefficient and the image thereby receives a reduced force. It is assumed that the urethane resin sufficiently exerts its mechanical strength and abrasion resistance is drastically improved.

Preferably, the wax is dispersed in water forming a water-based emulsion.

Specific examples of the wax include, but are not limited to, polyethylene wax and paraffin wax. One type of wax can be used alone, or two or more types of waxes can be used in combination. For storage stability of the ink, polyethylene wax is preferable.

The wax is commercially available. Specific examples of commercially-available products of the wax include, but are not limited to, HYTEC E-8237 (polyethylene wax having a melting point of 106° C. and an average particle diameter of 80 nm available from Toho Chemical Industry Co., Ltd.), AQUACER 531 (polyethylene wax having a melting point of 130° C. available from BYK Japan KK), AQUACER 515 (polyethylene wax having a melting point of 135° C. available from BYK Japan KK), and AQUACER 537 (paraffin having a melting point of 110° C. available from BYK Japan KK). Each of these waxes can be used alone or in combination with others.

Preferably, the wax has a melting point of from 70° C. to 170° C., more preferably from 100° C. to 140° C. When the melting point is 70° C. or more, the image is less sticky and image transfer does not occur even when the images are stacked on one another. When the melting point is 170° C. or less, the image melts by frictional heat when rubbed and becomes slippery, thus improving abrasion resistance.

Preferably, the wax has a volume average particle diameter of 200 nm or less, more preferably in the range of from 20 to 150 nm. When the volume average particle diameter is 200 nm or less, the ink can be stably discharged without clogging the nozzle or filter in the head.

The volume average particle diameter can be measured with a particle size distribution analyzer (MICROTRAC MODEL UPA9340 available from Nikkiso Co., Ltd.).

Preferably, the content rate of the wax in the recorded layer is in the range of from 0.09% to 0.5% by mass. When the content rate is in the range of from 0.09% to 0.5% by mass, dynamic friction coefficient of the surface of the resulting recorded layer (ink film) can be sufficiently reduced without adversely affecting storage stability and discharge stability of the ink.

Water

Preferably, the content rate of water in the ink is in the range of from 10% to 90% by mass, more preferably from 20% to 60% by mass, for drying property and discharge reliability of the ink.

The water may be pure water such as ion-exchange water, ultrafiltration water, reverse osmosis water, and distilled water, or ultrapure water. Each type of these waters can be used alone or in combination with others.

Additives

The ink may further include a surfactant, a defoamer, a preservative, a fungicide, a corrosion inhibitor, and/or a pH adjuster, if necessary.

Surfactant

Usable surfactants include silicone-based surfactants, fluorine-based surfactants, ampholytic surfactants, nonionic surfactants, and anionic surfactants.

The silicone-based surfactants have no specific limit and can be suitably selected to suit to a particular application. Preferred are silicone-based surfactants which are not decomposed even in a high pH environment. Specific examples thereof include, but are not limited to, side-chain-modified polydimethylsiloxane, both-end-modified polydimethylsiloxane, one-end-modified polydimethylsiloxane, and side-chain-both-end-modified polydimethylsiloxane. In particular, those having a polyoxyethylene group and/or a polyoxyethylene polyoxypropylene group as the modifying group are preferable because they demonstrate good characteristics as an aqueous surfactant. Specific examples of the silicone-based surfactants further include polyether-modified silicone-based surfactants, such as a dimethyl siloxane compound having a polyalkylene oxide structure unit on a side chain thereof which is bonded to Si.

Specific preferred examples of the fluorine-based surfactants include, but are not limited to, perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group on its side chain. These compounds have weak foaming property, which is preferable. Specific examples of the perfluoroalkyl sulfonic acid compounds include, but are not limited to, perfluoroalkyl sulfonic acid and perfluoroalkyl sulfonate. Specific examples of the perfluoroalkyl carboxylic acid compounds include, but are not limited to, perfluoroalkyl carboxylic acid and perfluoroalkyl carboxylate. Specific examples of the polyoxyalkylene ether polymer compounds having a perfluoroalkyl ether group on a side chain include, but are not limited to, a sulfate of a polyoxyalkylene ether polymer having a perfluoroalkyl ether group on its side chain, and a salt of a polyoxyalkylene ether polymer having a perfluoroalkyl ether group on its side chain. Specific examples of the counter ions for these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, laurylaminopropionate, lauryl dimethyl betaine, stearyl dimethyl betaine, and lauryl hydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block copolymers, sorbitan fatty acid esters, polyoxyethylene sorbitan fatty acid esters, and ethylene oxide adducts of acetylene alcohol.

Specific examples of the anionic surfactants include, but are not limited to, acetate, dodecylbenzene sulfonate, and laurate of polyoxyethylene alkyl ether, and polyoxyethylene alkyl ether sulfate.

Each of these compounds can be used alone or in combination with others.

Specific examples of the silicone-based surfactants include, but are not limited to, side-chain-modified polydimethylsiloxane, both-end-modified polydimethylsiloxane, one-end-modified polydimethylsiloxane, and side-chain-and-both-end-modified polydimethylsiloxane. More specifically, polyether-modified silicone-based surfactants having polyoxyethylene group and/or polyoxyethylene polyoxypropylene group as the modifying groups are preferable since they exhibit good properties as an aqueous surfactant.

These surfactants are available either synthetically or commercially. Commercial products are readily available from BYK Japan KK, Shin-Etsu Chemical Co., Ltd., Dow Corning Toray Co., Ltd., Nihon Emulsion Co., Ltd., and Kyoeisha Chemical Co., Ltd.

Specific examples of the polyether-modified silicone-based surfactants include, but are not limited to, a compound represented by the following formula (S-1) that is a dimethylpolysiloxane having a polyalkylene oxide structure on its side chain bonded to Si atom.

Formula (S-1)

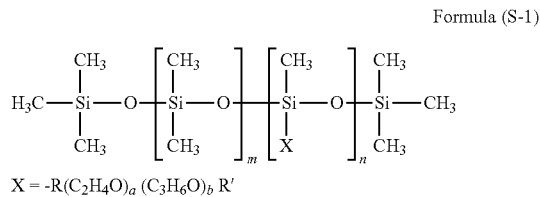

X = -R(C$_2$H$_4$O)$_a$ (C$_3$H$_6$O)$_b$ R'

In the formula (S-1), each of m, n, a, and b independently represents an integer, R represents an alkylene group, and R' represents an alkyl group.

Specific examples of commercially-available polyether-modified silicone-based surfactants include, but are not limited to: KF-618, KF-642, and KF-643 (available from Shin-Etsu Chemical Co., Ltd.); EMALEX-SS-5602 and SS-1906EX (available from Nihon Emulsion Co., Ltd.); FZ-2105, FZ-2118, FZ-2154, FZ-2161, FZ-2162, FZ-2163, and FZ-2164 (available from Dow Corning Toray Co., Ltd); BYK-33 and BYK-387 (available from BYK Japan KK); and TSF4440, TSF4452, and TSF4453 (available from Momentive Performance Materials Inc.).

Preferably, the fluorine-based surfactant is a compound having 2 to 16 fluorine-substituted carbon atoms, more preferably a compound having 4 to 16 fluorine-substituted carbon atoms.

Specific examples of the fluorine-based surfactants include, but are not limited to, perfluoroalkyl phosphate compounds, perfluoroalkyl ethylene oxide adducts, and polyoxyalkylene ether polymer compounds having a perfluoroalkyl ether group on its side chain. Among these fluorine-based surfactants, polyoxyalkylene ether polymer compounds having a perfluoroalkyl ether group on its side chain are preferable since foaming property thereof is small. More specifically, compounds represented by the following formula (F-1) and (F-2) are preferable.

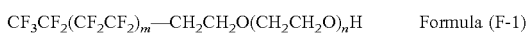
CF$_3$CF$_2$(CF$_2$CF$_2$)$_m$—CH$_2$CH$_2$O(CH$_2$CH$_2$O)$_n$H     Formula (F-1)

In the formula (F-1), m is preferably an integer ranging from 0 to 10, and n is preferably an integer ranging from 0 to 40, to give water-solubility to the compound.

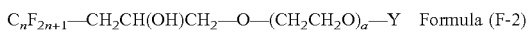
C$_n$F$_{2n+1}$—CH$_2$CH(OH)CH$_2$—O—(CH$_2$CH$_2$O)$_a$—Y     Formula (F-2)

In the formula (F-2), Y represents H, C$_n$F$_{2n+1}$ (where n represents an integer of from 1 to 6), CH$_2$CH(OH)CH$_2$—C$_n$F$_{2n+1}$ (where n represents an integer of from 4 to 6), or C$_p$F$_{2p+1}$ (where p represents an integer of from 1 to 19); and a represents an integer of from 4 to 14.

The fluorine-based surfactants are available either synthetically or commercially. Specific examples of commercially-available fluorine-based surfactants include, but are not limited to: SURFLON S-111, S-112, S-113, S-121, S-131, S-132, S-141, and S-145 (available from Asahi Glass Co., Ltd.); Fluorad™ FC-93, FC-95, FC-98, FC-129, FC-135, FC-170C, FC-430, and FC-431 (available from Sumitomo 3M Limited); MEGAFACE F-470, F-1405, and F-474 (available from DIC Corporation); Zonyl® TBS, FSP, FSA, FSN-100, FSN, FSO-100, FSO, FS-300, UR, CAPSTONE FS-30, FS-31, FS-3100, FS-34, and FS-35 (available from The Chemours Company); FT-110, FT-250, FT-251, FT-4005, FT-150, and FT-400SW (available from NEOS COMPANY LIMITED), PolyFox PF-136A, PF-156A, PF-151N, PF-154, and PF-159 (available from OMNOVA Solutions Inc.); and UNIDYNE™ DSN-403N (available from Daikin Industries, Ltd.). Among these, for improving printing quality, in particular color developing property, paper permeability, paper wettability, and uniform dying property, FS-3100, FS-34, and FS-300 (available from The Chemours Company), FT-110, FT-250, FT-251, FT-400S, FT-150, and FT-400SW (available from NEOS COMPANY LIMITED), PolyFox PF-151N (available from OMNOVA Solutions Inc.), and UNIDYNE™ DSN-403N (available from Daikin Industries, Ltd.) are particularly preferred.

Preferably, the content rate of the surfactant in the ink is in the range of from 0.001% to 5% by mass, more preferably from 0.05% to 5% by mass, for improving wettability, discharge stability, and image quality.

Defoamer

Specific examples of the defoamer include, but are not limited to, silicone defoamers, polyether defoamers, and fatty acid ester defoamers. Each of these compounds can be used alone or in combination with others. Among these defoamers, silicone defoamers are preferable since they have excellent defoaming ability.

Preservative and Fungicide

Specific examples of the preservative and fungicide include, but are not limited to, 1,2-benzisothiazoline-3-one.

Corrosion Inhibitor

Specific examples of the corrosion inhibitor include, but are not limited to, acid sulphite and sodium thiosulfate.

pH Adjuster

The pH adjuster has no particular limit so long as it is capable of adjusting the pH to 7 or higher. Specific examples of such a pH adjuster include, but are not limited to, amines such as diethanolamine and triethanolamine.

The properties of the ink, such as viscosity, surface tension, and pH, are not particularly limited and can be suitably selected to suit to a particular application.

Preferably, the ink has a viscosity at 25° C. in the range of from 5 to 30 mPa·s, more preferably from 5 to 25 mPa·s, for improving print density and text quality and obtaining good dischargeability. The viscosity can be measured at 25° C. by a rotatory viscometer (RE-80L available from Toki Sangyo Co., Ltd.) equipped with a standard cone rotor (1°34'×R24), while setting the sample liquid amount to 1.2 mL, the number of rotations to 50 rotations per minute (rpm), and the measuring time to 3 minutes.

Preferably, the ink has a surface tension of 35 mN/m or less, more preferably 32 mN/m or less, at 25° C., so that the ink is suitably levelized on a recording medium and the drying time of the ink is shortened.

Preferably, the ink has a pH in the range of from 7 to 12, more preferably from 8 to 11, for preventing corrosion of metal materials contacting the ink.

Method of Forming Recorded Layer

The recorded layer may be formed by recording information with an ink that is manufactured by stir-mixing the water, organic solvent, resin particles, and colorant, optionally along with the wax and the additives. The stir-mixing may be performed by a sand mill, homogenizer, ball mill, paint shaker, ultrasonic disperser, stirrer equipped with stirring blades, magnetic stirrer, or high-speed disperser.

Recording Medium

Specific examples of the recording medium include, but are not limited to, plain paper, glossy paper, special paper, clothes, and general-purpose printing paper.

Recorded Matter

The recorded matter according to an embodiment of the present invention includes the recording medium and an image formed with the ink on the recording medium.

The recorded matter may be manufactured by an inkjet recording device and an inkjet recording method.

In accordance with some embodiments of the present invention, the recorded matter includes a recording medium and a recorded layer containing an organic solvent and a colorant. The organic solvent includes a hexanediol and propylene glycol. An infrared absorption spectrum of the recorded layer, obtained by Fourier transform infrared spectroscopy, exhibits an area ratio (B/A) of an area B to an area A ranging from 0.3 to 1.0, where the area A is defined between the spectrum within a wavenumber range of from 692 to 707 $cm^{-1}$ and a first tangent line connecting a first minimum point of the spectrum within a first wavenumber range of from 710 to 740 $cm^{-1}$ and a second minimum point of the spectrum within a second wavenumber range of from 660 to 690 $cm^{-1}$, and the area B is defined between the spectrum within a wavenumber range of from 1,731 to 1,750 $cm^{-1}$ and a second tangent line connecting a third minimum point of the spectrum within a third wavenumber range of from 1,660 to 1,690 $cm^{-1}$ and a fourth minimum point of the spectrum within a fourth wavenumber range of from 1,760 to 1,790 $cm^{-1}$.

Ink Storage Container

The ink for forming the recorded layer of the recorded matter is preferably stored in an ink storage container.

The ink storage container includes a container and the ink contained in the container, and optionally other members as necessary.

The container is not limited in shape, structure, size, and material. Examples of the container include, but are not limited to, an ink bag which is formed of an aluminum laminate film or a resin film.

Recording Device and Recording Method

The ink according to an embodiment of the present invention can be suitably applied to various recording devices employing an inkjet recording method, such as printers, facsimile machines, photocopiers, multifunction peripherals (having the functions of printer, facsimile machine, and photocopier), and three-dimensional objects manufacturing devices.

In the present disclosure, the recording device and the recording method respectively represent a device capable of discharging inks or various treatment liquids to a recording medium and a method for recording an image on the recording medium using the device. The recording medium refers to an article to which the inks or the various treatment liquids can be attached at least temporarily.

The recording device may further optionally include devices relating to feeding, conveying, and ejecting of the recording medium and other devices referred to as a pretreatment device or an aftertreatment device, in addition to the ink discharger.

The recording device may further optionally include a heater for use in the heating process and a drier for use in the drying process. Examples of the heater and the drier include devices for heating and drying the printed surface and the reverse surface of a recording medium. Specific examples of the heater and the drier include, but are not limited to, a fan heater and an infrared heater. The heating process and the drying process may be performed either before, during, or after printing.

In addition, the recording device and the recording method are not limited to those producing merely meaningful visible images such as texts and figures with the ink. For example, the recording device and the recording method can produce patterns like geometric design and 3D images.

The recording device includes both a serial type device in which the discharge head is caused to move and a line type device in which the discharge head is not moved.

Furthermore, in addition to the desktop type, the recording device includes a device capable of printing images on a large recording medium with A0 size and a continuous printer capable of using continuous paper reeled up in a roll form as recording media.

Figure 2:
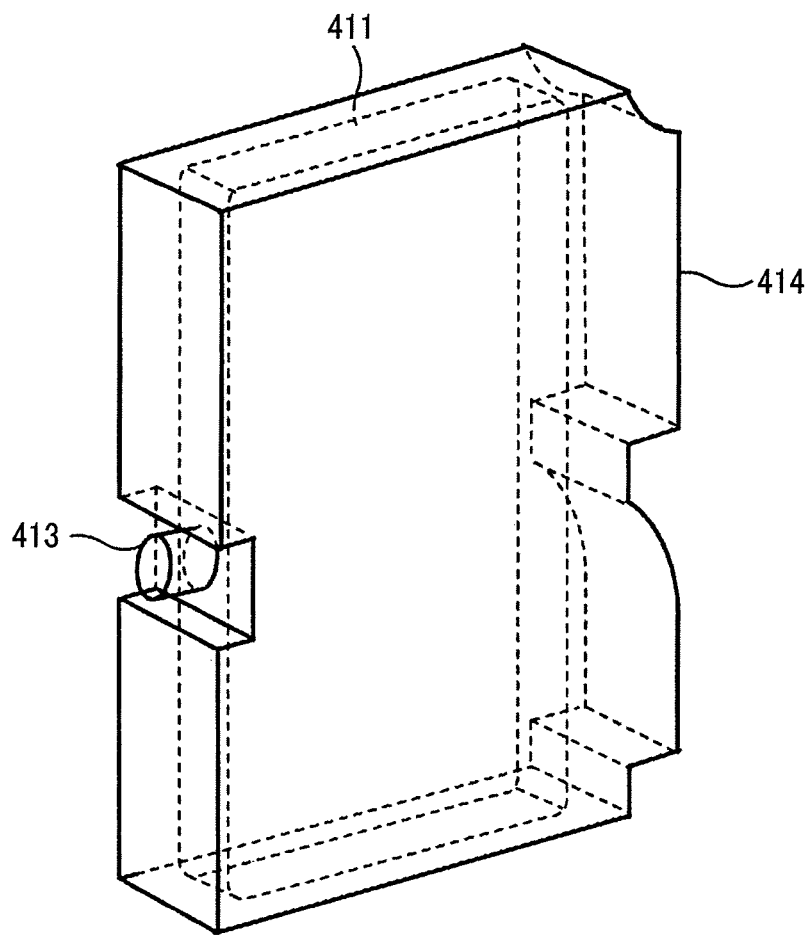
FIG. 2 is a perspective view of a main tank for use in the image forming apparatus illustrated in FIG. 1.

As one example of the recording device according to an embodiment of the present invention, an image forming apparatus 400 is described in detail below with reference to FIGS. 1 and 2. FIG. 1 is a perspective view of an image forming apparatus 400. FIG. 2 is a perspective view of a main tank for use in the image forming apparatus 400. The image forming apparatus 400 is a serial-type image forming apparatus. A mechanical unit 420 is disposed in a housing 401 of the image forming apparatus 400. Main tanks 410k, 410c, 410m, and 410y for respective color of black (K), cyan (C), magenta (M), and yellow (Y) (hereinafter collectively referred to as "main tank 410") each include an ink container 411. Each ink container 411 is made of a packaging member such as an aluminum laminate film. The ink container 411 is accommodated in a container casing 414 made of plastic. As a result, the main tank 410 is used as an ink cartridge of each color.

A cartridge holder 404 is disposed on the rear side of the opening when a cover 401c is opened. The main tank 410 is detachably attachable to the cartridge holder 404. As a result, each ink discharging outlet 413 of the main tank 410 communicates with a discharge head 434 for each color via a supplying tube 436 for each color so that the ink can be discharged from the discharge head 434 to a recording medium.

The recording device according to an embodiment of the present invention may further optionally include a pretreatment device and/or an aftertreatment device, in addition to the ink discharger.

As an example, the pretreatment device and the aftertreatment device may be provided as a liquid discharger including a liquid container containing the pretreatment or aftertreatment liquid and a liquid discharge head to discharge the pretreatment or aftertreatment liquid by inkjet recording method, having a similar configuration to the liquid discharger for each of the black (K), cyan (C), magenta (M), and yellow (Y) inks.

As another example, the pretreatment device and the aftertreatment device may be provided as a device employing a method other than inkjet recording method, such as blade coating, roll coating, or spray coating.

The ink may be applied not only to inkjet recording method but also to other methods in various fields. Specific examples of such methods other than inkjet recording method include, but are not limited to, blade coating methods, gravure coating methods, bar coating methods, roll coating methods, dip coating methods, curtain coating methods, slide coating methods, die coating methods, and spray coating methods.

The applications of the ink of the present disclosure are not particularly limited. For example, the ink can be used for printed matter, a paint, a coating material, and foundation. The ink can be used to form two-dimensional texts and images and furthermore three-dimensional objects.

The apparatus for manufacturing three-dimensional objects can be any known device with no particular limit. For example, the apparatus includes an ink container, a supplying device, and a discharging device, a drier, etc. The three-dimensional object includes an object produced by re-applying ink over and over. In addition, the three-dimensional object includes a processed product produced by processing a structure including a substrate (such as a recording medium) and an ink applied thereon. The processed product is fabricated by, for example, heating drawing or punching a structure or recorded matter having a sheet-like form, film-like form, etc. The processed product is suitable for what is formed after surface-decorating. Examples thereof are gauges or operation panels of vehicles, office machines, electric and electronic devices, cameras, etc.

EXAMPLES

Further understanding can be obtained by reference to certain specific examples which are provided herein for the purpose of illustration only and are not intended to be limiting.

In the following Examples, the area ratio (B/A) in the recorded layer of the recorded matter was determined as follows.

Area Ratio (B/A)

An infrared absorption spectrum of each recorded layer was obtained by measuring the surface of the recorded layer with an instrument SPECTRUM ONE (available from PerkinElmer Japan Co., Ltd.) using a diamond indenter according to the ATR method. The area A, defined between the spectrum within a wavenumber range of from 692 to 707 $cm^{-1}$ and a first tangent line connecting a first minimum point of the spectrum within a first wavenumber range of from 710 to 740 $cm^{-1}$ and a second minimum point of the spectrum within a second wavenumber range of from 660 to 690 $cm^{-1}$, and the area B, defined between the spectrum within a wavenumber range of from 1,731 to 1,750 $cm^{-1}$ and a second tangent line connecting a third minimum point of the spectrum within a third wavenumber range of from 1,660 to 1,690 $cm^{-1}$ and a fourth minimum point of the spectrum within a fourth wavenumber range of from 1,760 to 1,790 $cm^{-1}$, were calculated first and then the area ratio (B/A) was determined.

Pigment Dispersion Preparation Example 1
Preparation of Cyan Pigment Dispersion

A cyan pigment dispersion was prepared in the same manner as the Pigment Surface Modification Treatment—Method A—described in JP-2012-207202-A.

Specifically, 20 g of C.I. Pigment Blue 15:3 (CHROMOFINE BLUE available from Dainichiseika Color & Chemicals Mfg. Co., Ltd.), 20 mmol of a compound having the following formula (1), and 200 mL of ion-exchange water were mixed with a SILVERSON mixer (at a revolution of 6,000 rpm (0.6% by mass)) at room temperature (25° C.), thus preparing a slurry. In a case in which the slurry had a pH higher than 4, 20 mmol of nitric acid was added thereto. Thirty minutes later, 20 mmol of sodium nitrite dissolved in a small amount of ion-exchange water was gently added to the slurry. The slurry was further heated to 60° C. while being stirred and subjected to a reaction for 1 hour. As a result, a modified pigment in which the compound having the formula (1) was added to the surface of the C.I. Pigment Blue 15:3 was prepared. Next, the pH was adjusted to 10 by adding an NaOH aqueous solution, and a modified pigment dispersion was obtained 30 minutes later. The modified pigment dispersion was subjected to ultrafiltration using ion-exchange water and a dialysis membrane and further to ultrasonic dispersion. Thus, a cyan pigment dispersion (self-dispersible type) having a pigment concentration of 15% by mass was prepared. The cyan pigment has bisphosphonate group as a hydrophilic functional group.

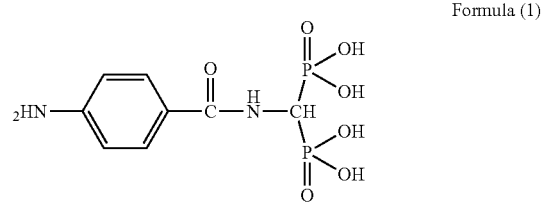

Formula (1)

Pigment Dispersion Preparation Example 2
Preparation of Magenta Pigment Dispersion The procedure in Pigment Dispersion Preparation Example 1 was repeated except for replacing the 20 g of C.I. Pigment Blue 15:3 with 20 g of C.I. Pigment Red 122 (TONER MAGENTA E002 available from Clariant Japan KK). Thus, a magenta pigment dispersion having a pigment concentration of 15% by mass was prepared.

Pigment Dispersion Preparation Example 3
Preparation of Yellow Pigment Dispersion The procedure in Pigment Dispersion Preparation Example 1 was repeated except for replacing the 20 g of C.I. Pigment Blue 15:3 with 20 g of C.I. Pigment Yellow 74 (FAST YELLOW 531 available from Dainichiseika Color & Chemicals Mfg. Co., Ltd.). Thus, a yellow pigment dispersion having a pigment concentration of 15% by mass was prepared.

Ink Preparation Example 1
Preparation of Ink 1

An ink 1 was prepared by: stir-mixing 15.0% by mass of the cyan pigment dispersion, 25.0% by mass of propylene glycol (1,2-propanediol, product name: PG FOR INDUSTRIAL USE available from ADEKA CORPORATION), 5.0% by mass of 1,2-hexanediol (product name: 1,24-HEXANEDIOL available from Tokyo Chemical Industry Co., Ltd.), 6.0% by mass of an acrylic silicone resin particle liquid (having a solid content concentration of 30% by mass) containing a particulate acrylic silicone resin (SYMAC® US480 available from Toagosei Co., Ltd.), 4.0% by mass of a polycarbonate urethane resin particle liquid (having a solid content concentration of 30% by mass) containing a particulate polycarbonate urethane resin (TAKELAC W6110 available from Mitsui Chemicals, Inc.), 2.0% by mass of a polyether-modified siloxane copolymer (TEGO Wet 270 available from Tomoe Engineering Co., Ltd.), and ion-exchange water in a residual amount such that the total percentage became 100% by mass; and filtering the mixture with a membrane filter (ADVANTEC® DISMIC-25CS available from Toyo Roshi Kaisha, Ltd.) having an average pore diameter of 0.8 μm.

Ink Preparation Examples 2 to 18
Preparation of Inks 2 to 18

The procedure in Ink Preparation Example 1 was repeated except for changing the composition according to the formulations described in Tables 1 to 4, thus preparing inks 2 to 18.

TABLE 1

|  |  |  | \multicolumn{5}{c}{Inks} |
| --- | --- | --- | --- | --- | --- | --- | --- |
|  |  |  | 1 | 2 | 3 | 4 | 5 |
| Colorants |  | Cyan pigment dispersion | 15.0 | 15.0 | 15.0 | 15.0 | 15.0 |
|  |  | Magenta pigment dispersion | — | — | — | — | — |
|  |  | Yellow pigment dispersion | — | — | — | — | — |
| Organic Solvents |  | Propylene glycol | 25.0 | 25.0 | 25.0 | 25.0 | 25.0 |
|  |  | 1,2-Hexanediol | 5.0 | 5.0 | 5.0 | 5.0 | — |
|  |  | 1,6-Hexanediol | — | — | — | — | 5.0 |
|  |  | 3-Ethyl-3-hydroxymethyloxetane | — | — | — | — | — |
| Resin Particles | Acrylic Resin Particles | Acrylic silicone resin particle liquid | 6.0 | 7.0 | 9.0 | 9.0 | 7.0 |
|  |  | Styrene acrylic resin particle liquid | — | — | — | — | — |
|  | Urethane Resin Particles | Polycarbonate urethane resin particle liquid | 4.0 | 3.0 | 1.0 | 1.0 | 3.0 |
|  |  | Polyester urethane resin particle liquid | — | — | — | — | — |
|  |  | Polyether urethane resin particle liquid | — | — | — | — | — |
| Wax |  | Polyethylene wax liquid | — | — | — | 3.0 | — |
| Surfactant |  | Polyether-modified siloxane copolymer | 2.0 | 2.0 | 2.0 | 2.0 | 2.0 |
| Water |  | Ion-exchange water | Residual amount | Residual amount | Residual amount | Residual amount | Residual amount |
|  | Total (% by mass) |  | 100 | 100 | 100 | 100 | 100 |
|  | Mass Ratio (Urethane Resin Particle/Acrylic Resin Particle) |  | 0.67 | 0.43 | 0.11 | 0.11 | 0.43 |
|  | Mass Ratio (Resin Particles/Colorants) |  | 1.33 | 1.33 | 1.33 | 1.33 | 1.33 |

TABLE 2

|  |  |  | \multicolumn{5}{c}{Inks} |
| --- | --- | --- | --- | --- | --- | --- | --- |
|  |  |  | 6 | 7 | 8 | 9 | 10 |
| Colorants |  | Cyan pigment dispersion | — | — | 15.0 | 15.0 | 15.0 |
|  |  | Magenta pigment dispersion | 15.0 | — | — | — | — |
|  |  | Yellow pigment dispersion | — | 15.0 | — | — | — |
| Organic Solvents |  | Propylene glycol | 20.0 | 20.0 | 25.0 | 25.0 | 25.0 |
|  |  | 1,2-Hexanediol | 10.0 | — | 5.0 | 5.0 | 5.0 |
|  |  | 1,6-Hexanediol | — | 10.0 | — | — | — |
|  |  | 3-Ethyl-3-hydroxymethyloxetane | — | — | — | — | — |
| Resin Particles | Acrylic Resin Particles | Acrylic silicone resin particle liquid | 7.0 | 7.0 | — | 7.0 | 7.0 |
|  |  | Styrene acrylic resin particle liquid | — | — | 7.0 | — | — |
|  | Urethane Resin Particles | Polycarbonate urethane resin particle liquid | 3.0 | 3.0 | 3.0 | — | — |
|  |  | Polyester urethane resin particle liquid | — | — | — | 3.0 | — |
|  |  | Polyether urethane resin particle liquid | — | — | — | — | 3.0 |
| Wax |  | Polyethylene wax liquid | — | — | — | — | — |
| Surfactant |  | Polyether-modified siloxane copolymer | 2.0 | 2.0 | 2.0 | 2.0 | 2.0 |
| Water |  | Ion-exchange water | Residual amount | Residual amount | Residual amount | Residual amount | Residual amount |
|  | Total (% by mass) |  | 100 | 100 | 100 | 100 | 100 |
|  | Mass Ratio (Urethane Resin Particle/Acrylic Resin Particle) |  | 0.43 | 0.43 | 0.43 | 0.43 | 0.43 |
|  | Mass Ratio (Resin Particles/Colorants) |  | 1.33 | 1.33 | 1.33 | 1.33 | 1.33 |

TABLE 3

|  |  | \multicolumn{5}{c}{Inks} |
| --- | --- | --- | --- | --- | --- | --- |
|  |  | 11 | 12 | 13 | 14 | 15 |
| Colorants | Cyan pigment dispersion | 21.0 | 10.0 | 15.0 | 15.0 | 15.0 |
|  | Magenta pigment dispersion | — | — | — | — | — |
|  | Yellow pigment dispersion | — | — | — | — | — |

TABLE 3-continued

| | | | Inks | | | | |
|---|---|---|---|---|---|---|---|
| | | | 11 | 12 | 13 | 14 | 15 |
| Organic Solvents | | Propylene glycol | 25.0 | 25.0 | 25.0 | 25.0 | — |
| | | 1,2-Hexanediol | 5.0 | 5.0 | 5.0 | 5.0 | — |
| | | 1,6-Hexanediol | — | — | — | — | — |
| | | 3-Ethyl-3-hydroxymethyloxetane | — | — | — | — | 30.0 |
| Resin Particles | Acrylic Resin Particles | Acrylic silicone resin particle liquid | 3.0 | 10.0 | 4.0 | 5.0 | 7.0 |
| | | Styrene acrylic resin particle liquid | — | — | — | — | — |
| | Urethane Resin Particles | Polycarbonate urethane resin particle liquid | 2.0 | 6.0 | 6.0 | 5.0 | 3.0 |
| | | Polyester urethane resin particle liquid | — | — | — | — | — |
| | | Polyether urethane resin particle liquid | — | — | — | — | — |
| Wax | | Polyethylene wax liquid | — | — | — | — | — |
| Surfactant | | Polyether-modified siloxane copolymer | 2.0 | 2.0 | 2.0 | 2.0 | 2.0 |
| Water | | Ion-exchange water | Residual amount | Residual amount | Residual amount | Residual amount | Residual amount |
| | | Total (% by mass) | 100 | 100 | 100 | 100 | 100 |
| | | Mass Ratio (Urethane Resin Particle/Acrylic Resin Particle) | 0.67 | 0.60 | 1.50 | 1.00 | 0.43 |
| | | Mass Ratio (Resin Particles/Colorants) | 0.48 | 3.20 | 1.33 | 1.33 | 1.33 |

TABLE 4

| | | | Inks | | |
|---|---|---|---|---|---|
| | | | 16 | 17 | 18 |
| Colorants | | Cyan pigment dispersion | 15.0 | 15.0 | 15.0 |
| | | Magenta pigment dispersion | — | — | — |
| | | Yellow pigment dispersion | — | — | — |
| Organic Solvents | | Propylene glycol | 25.0 | — | 25.0 |
| | | 1,2-Hexanediol | — | 5.0 | 5.0 |
| | | 1,6-Hexanediol | — | — | — |
| | | 3-Ethyl-3-hydroxymethyloxetane | 5.0 | 25.0 | — |
| Resin Particles | Acrylic Resin Particles | Acrylic silicone resin particle liquid | 7.0 | 7.0 | 10.0 |
| | | Styrene acrylic resin particle liquid | — | — | — |
| | Urethane Resin Particles | Polycarbonate urethane resin particle liquid | 3.0 | 3.0 | — |
| | | Polyester urethane resin particle liquid | — | — | — |
| | | Polyether urethane resin particle liquid | — | — | — |
| Wax | | Polyethylene wax liquid | — | — | — |
| Surfactant | | Polyether-modified siloxane copolymer | 2.0 | 2.0 | 2.0 |
| Water | | Ion-exchange water | Residual amount | Residual amount | Residual amount |
| | | Total (% by mass) | 100 | 100 | 100 |
| | | Mass Ratio (Urethane Resin Particle/Acrylic Resin Particle) | 0.43 | 0.43 | — |
| | | Mass Ratio (Resin Particles/Colorants) | 1.33 | 1.33 | 1.33 |

The product names and manufacturers of the materials described in Tables 1 to 4 are listed below.

Organic Solvents
  Propylene glycol: 1,2-Propanediol, PG FOR INDUSTRIAL USE (product name) available from ADEKA CORPORATION
  1,2-Hexanediol: 1,2-HEXANEDIOL (product name) available from Tokyo Chemical Industry Co., Ltd.
  1,6-Hexanediol: 1,6-HEXANEDIOL (product name) available from Ube Industries, Ltd.
  3-Ethyl-3-hydroxymethyloxetane: EHO (product name) available from Ube Industries, Ltd.

Resin Particles
  Acrylic Resin Particles
    Acrylic silicone resin particle: SYMAC® US480 available from Toagosei Co., Ltd.
    Styrene acrylic resin particle: Polysol® AP-1120 available from Showa Denko K.K.
  Urethane Resin Particles
    Polycarbonate urethane resin particle: TAKELAC W6110 available from Mitsui Chemicals, Inc., having a Martens hardness of 10 N/mm$^2$ Polyester urethane resin particle: TAKELAC WS5984 available from Mitsui Chemicals, Inc., having a Martens hardness of 1 N/mm$^2$ Polyether urethane resin particle: TAKELAC W5661 available from Mitsui Chemicals, Inc., having a Martens hardness of 5 N/mm$^2$ Each resin particle was diluted with ion-exchange water so that the solid content became 30% by mass.

Wax

Polyethylene wax: AQUACER 531 available from BYK Japan KK, having a melting point of 130° C.

The wax was diluted with ion-exchange water so that the solid content became 30% by mass.

Examples 1 to 12 and Comparative Examples 1 to 6

An inkjet printer (IPSIO GX5500 available from Ricoh Co., Ltd.) was loaded with each ink. The inkjet printer was further loaded with paper sheets (Lumi Art Gloss 90 gsm available from Stora Enso) to record a solid image (recorded layer) having an ink deposition amount of 1.12 mg/cm$^2$ (700 mg/A4) and a resolution of 1,200 dpi×1,200 dpi thereon. Each recorded layer was dried at 100° for 1 minute, thus obtaining each recorded matter.

The recorded matters were subjected to the evaluations of conveyance property in low-humidity environments, abrasion resistance in low-humidity environments, and blocking property in high-temperature and high-humidity environments, in the following manner. The evaluation results are presented in Table 5.

Conveyance Property in Low-Humidity Environments

Each recorded matter was left to stand in respective low-humidity environments (having a temperature of 25° C. and a relative humidity of 40%; having a temperature of 25° C. and a relative humidity of and 30%; and having a temperature of 15° C. and a relative humidity of 10%) for 24 hours, and thereafter folded in three with a folding machine (EPF-200 available from MAX Co., Ltd.) in the same environments. Specifically, 300 sheets of each recorded matter were continuously subjected to the above treatment and the number of times that the recorded matter conveyance trouble occurred was counted. Conveyance property of each recorded matter in each low-humidity environment was evaluated according to the following criteria. The ranks A and B are acceptable.

Evaluation Criteria

A: The number of times of recorded matter conveyance troubles was zero.

B: The number of times of recorded matter conveyance troubles was one or two.

C: The number of times of recorded matter conveyance troubles was three or more.

Abrasion Resistance in Low-Humidity Environments

Each recorded matter was left to stand in respective low-humidity environments (having a temperature of 25° C. and a relative humidity of 40%; having a temperature of 25° C. and a relative humidity of and 30%; and having a temperature of 15° C. and a relative humidity of 10%) for 24 hours. The solid image part was thereafter abraded with a 1.2-cm-square piece of paper (LumiArt Gloss 90 gsm available from Stora Enso) with a load of 400 g for 20 times in the same environments. The degree of ink deposition fouling on the piece of paper was determined from the difference in color density before and after abrading the solid image part. The color density was measured with a reflective spectrophotometric color densitometer (available from X-Rite). Abrasion resistance in each low-humidity environment was evaluated based on the difference in color density of the piece of paper according to the following criteria. The ranks A and B are acceptable.

Evaluation Criteria

A: The difference in color density was less than 0.10.

B: The difference in color density was 0.10 or more but less than 0.20.

C: The difference in color density was 0.20 or more.

Blocking Property in High-Temperature and High-Humidity Environments

Each recorded matter was left to stand in a high-temperature and high-humidity environment (having a temperature of 32° C. and a relative humidity of 80%) for 24 hours. The recorded matters were thereafter stacked on each other in such a way that the images were contacting each other with a load of 0.5 kg/cm$^2$ and left to stand in the same environments for 24 hours. Blocking property was evaluated based on whether image transfer had occurred or not according to the following criteria. The ranks A and B are acceptable.

Evaluation Criteria

A: Image transfer occurred.

B: Image transfer did not occur.

TABLE 5-1

|  |  | Ink | Mass Ratio (Urethane Resin/Acrylic Resin) | Area Ratio (B/A) | Propylene Glycol Residual Conc. (mg/m$^2$) | Hexanediol Residual Conc. (mg/m$^2$) | Mass Ratio (Resin/Colorant) |
|---|---|---|---|---|---|---|---|
| Examples | 1 | 1 | 0.67 | 0.92 | 50 | 10 | 1.33 |
|  | 2 | 2 | 0.43 | 0.68 | 45 | 8 | 1.33 |
|  | 3 | 3 | 0.11 | 0.31 | 42 | 7 | 1.33 |
|  | 4 | 4 | 0.11 | 0.31 | 43 | 8 | 1.33 |
|  | 5 | 5 | 0.43 | 0.68 | 46 | 12 | 1.33 |
|  | 6 | 6 | 0.43 | 0.68 | 40 | 17 | 1.33 |
|  | 7 | 7 | 0.43 | 0.68 | 42 | 21 | 1.33 |
|  | 8 | 8 | 0.43 | 0.65 | 43 | 10 | 1.33 |
|  | 9 | 9 | 0.43 | 0.64 | 47 | 10 | 1.33 |
|  | 10 | 10 | 0.43 | 0.66 | 45 | 8 | 1.33 |
|  | 11 | 11 | 0.67 | 0.9 | 40 | 5 | 0.48 |
|  | 12 | 12 | 0.60 | 0.78 | 42 | 8 | 3.20 |
| Comparative Examples | 1 | 13 | 1.50 | 1.4 | 50 | 11 | 1.33 |
|  | 2 | 14 | 1.00 | 1.19 | 49 | 10 | 1.33 |
|  | 3 | 15 | 0.43 | 0.68 | 0 | 0 | 1.33 |
|  | 4 | 16 | 0 43 | 0.68 | 40 | 0 | 1.33 |

TABLE 5-1-continued

| Ink | | Mass Ratio (Urethane Resin/Acrylic Resin) | Area Ratio (B/A) | Propylene Glycol Residual Conc. (mg/m$^2$) | Hexanediol Residual Conc. (mg/m$^2$) | Mass Ratio (Resin/Colorant) |
|---|---|---|---|---|---|---|
| 5 | 17 | 0.43 | 0.68 | 0 | 10 | 1.33 |
| 6 | 18 | — | — | 41 | 9 | 1.33 |

TABLE 5-2

| | | | Evaluation Results | | | | | |
|---|---|---|---|---|---|---|---|---|
| | | | Conveyance Property in Low-humidity Environments | | | Abrasion Resistance in Low-humidity Environments | | | Blocking Property in High-temperature and |
| | Ink | | 25° C., 40% RH | 25° C., 30% RH | 15° C., 10% RH | 25° C., 40% RH | 25° C., 30% RH | 15° C., 10% RH | High-humidity Environments |
| Examples | 1 | 1 | A | A | A | A | A | A | A |
| | 2 | 2 | A | A | B | A | A | B | A |
| | 3 | 3 | B | B | B | A | B | B | A |
| | 4 | 4 | B | B | B | A | A | A | A |
| | 5 | 5 | A | A | B | A | B | B | A |
| | 6 | 6 | A | B | B | A | B | B | A |
| | 7 | 7 | A | A | B | A | A | A | A |
| | 8 | 8 | A | B | B | B | B | B | A |
| | 9 | 9 | A | B | B | B | B | B | A |
| | 10 | 10 | A | B | B | B | B | B | A |
| | 11 | 11 | A | B | B | B | B | B | A |
| | 12 | 12 | A | A | A | A | A | A | A |
| Comparative Examples | 1 | 13 | C | C | C | C | C | C | B |
| | 2 | 14 | C | C | C | C | C | C | B |
| | 3 | 15 | C | C | C | C | C | C | A |
| | 4 | 16 | C | C | C | C | C | C | A |
| | 5 | 17 | C | C | C | C | C | C | A |
| | 6 | 18 | C | C | C | C | C | C | A |

In accordance with some embodiments of the present invention, the following 1) to 11) are provided.

1) A method of using recorded matter comprising:
conveying a recorded matter at a relative humidity of 40% or less, the recorded matter including:
a recording medium; and
a recorded layer on the recording medium, including:
an organic solvent including a hexanediol and a propylene glycol;
a colorant; and
a resin including an acrylic resin and a urethane resin, where a mass ratio of the urethane resin to the acrylic resin ranges from 0.1 to 0.7.

2) The above method 1), wherein the urethane resin includes a polycarbonate urethane resin.

3) The above method 1), wherein the acrylic resin includes an acrylic silicone resin.

4) The above method 1), wherein a mass ratio of the resin to the colorant ranges from 0.50 to 3.5.

5) The above method 1), further comprising:
conveying the recorded matter at a temperature of 30° C. or more and a relative humidity of 80% or more.

6) The above method 1), wherein the recorded matter is conveyed at a relative humidity of 30% or less.

7) A method of using recorded matter comprising:
conveying a recorded matter at a relative humidity of 40% or less, the recorded matter including:
a recording medium; and
a recorded layer on the recording medium, including:
an organic solvent including a hexanediol and a propylene glycol; and
a colorant,
wherein an infrared absorption spectrum of the recorded layer, obtained by Fourier transform infrared spectroscopy, exhibits an area ratio (B/A) of an area B to an area A ranging from 0.3 to 1.0,
wherein the area A is defined between the spectrum within a wavenumber range of from 692 to 707 cm$^{-1}$ and a first tangent line connecting a first minimum point of the spectrum within a first wavenumber range of from 710 to 740 cm$^{-1}$ and a second minimum point of the spectrum within a second wavenumber range of from 660 to 690 cm$^{-1}$, and
wherein the area B is defined between the spectrum within a wavenumber range of from 1,731 to 1,750 cm$^{-1}$ and a second tangent line connecting a third minimum point of the spectrum within a third wavenumber range of from 1,660 to 1,690 cm$^{-1}$ and a fourth minimum point of the spectrum within a fourth wavenumber range of from 1,760 to 1,790 cm$^{-1}$.

8) A recorded matter comprising:
a recording medium; and
a recorded layer on the recording medium, including:
an organic solvent including a hexanediol and a propylene glycol;
a colorant; and
a resin including an acrylic resin and a urethane resin, where a mass ratio of the urethane resin to the acrylic resin ranges from 0.1 to 0.7.

9) A recorded matter comprising:
a recording medium; and
a recorded layer on the recording medium, including:
an organic solvent including a hexanediol and a propylene glycol; and
a colorant, wherein an infrared absorption spectrum of the recorded layer, obtained by Fourier transform infrared spectroscopy, exhibits an area ratio (B/A) of an area B to an area A ranging from 0.3 to 1.0, wherein the area A is defined between the spectrum within a wavenumber range of from 692 to 707 cm$^{-1}$ and a first tangent line connecting a first minimum point of the spectrum within a first wavenumber range of from 710 to 740 cm$^{-1}$ and a second minimum point of the spectrum within a second wavenumber range of from 660 to 690 cm$^{-1}$, and wherein the area B is defined between the spectrum within a wavenumber range of from 1,731 to 1,750 cm$^{-1}$ and a second tangent line connecting a third minimum point of the spectrum within a third wavenumber range of from 1,660 to 1,690 cm$^{-1}$ and a fourth minimum point of the spectrum within a fourth wavenumber range of from 1,760 to 1,790 cm$^{-1}$.

10) A method of manufacturing recorded matter, comprising:
forming a recorded layer on a recording medium; and
conveying the recorded medium at a relative humidity of 40% or less,
wherein the recorded layer includes:
an organic solvent including a hexanediol and a propylene glycol;
a colorant; and
a resin including an acrylic resin and a urethane resin, where a mass ratio of the urethane resin to the acrylic resin ranges from 0.1 to 0.7.

11) A method of manufacturing recorded matter, comprising:
forming a recorded layer on a recording medium; and
conveying the recorded medium at a relative humidity of 40% or less,
wherein the recorded layer includes:
an organic solvent including a hexanediol and a propylene glycol; and
a colorant,
wherein an infrared absorption spectrum of the recorded layer, obtained by Fourier transform infrared spectroscopy, exhibits an area ratio (B/A) of an area B to an area A ranging from 0.3 to 1.0, wherein the area A is defined between the spectrum within a wavenumber range of from 692 to 707 cm$^{-1}$ and a first tangent line connecting a first minimum point of the spectrum within a first wavenumber range of from 710 to 740 cm$^{-1}$ and a second minimum point of the spectrum within a second wavenumber range of from 660 to 690 cm$^{-1}$, and wherein the area B is defined between the spectrum within a wavenumber range of from 1,731 to 1,750 cm$^{-1}$ and a second tangent line connecting a third minimum point of the spectrum within a third wavenumber range of from 1,660 to 1,690 cm$^{-1}$ and a fourth minimum point of the spectrum within a fourth wavenumber range of from 1,760 to 1,790 cm$^{-1}$.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A method of using recorded matter comprising:
conveying a recorded matter at a relative humidity of 40% or less, the recorded matter including:
a recording medium; and
a recorded layer on the recording medium, including:
an organic solvent including a hexanediol and a propylene glycol;
a colorant; and
a resin including an acrylic resin and a urethane resin, where a mass ratio of the urethane resin to the acrylic resin ranges from 0.1 to 0.7.

2. The method of claim 1, wherein the urethane resin includes a polycarbonate urethane resin.

3. The method of claim 1, wherein the acrylic resin includes an acrylic silicone resin.

4. The method of claim 1, wherein a mass ratio of the resin to the colorant ranges from 0.50 to 3.5.

5. The method of claim 1, further comprising:
conveying the recorded matter at a temperature of 30° C. or more and a relative humidity of 80% or more.

6. The method of claim 1, wherein the recorded matter is conveyed at a relative humidity of 30% or less.

7. A recorded matter comprising:
a recording medium; and
a recorded layer on the recording medium, including:
an organic solvent including a hexanediol and a propylene glycol;
a colorant; and
a resin including an acrylic resin and a urethane resin, where a mass ratio of the urethane resin to the acrylic resin ranges from 0.1 to 0.7.

8. A method of manufacturing recorded matter, comprising:
forming a recorded layer on a recording medium; and
conveying the recorded medium at a relative humidity of 40% or less,
wherein the recorded layer includes:
an organic solvent including a hexanediol and a propylene glycol;
a colorant; and
a resin including an acrylic resin and a urethane resin, where a mass ratio of the urethane resin to the acrylic resin ranges from 0.1 to 0.7.

* * * * *